(12) United States Patent
Barkan et al.

(10) Patent No.: US 12,400,093 B2
(45) Date of Patent: Aug. 26, 2025

(54) BARCODE WITH BUILT-IN CHEMICAL INDICATORS

(71) Applicant: ZEBRA TECHNOLOGIES CORPORATION, Lincolnshire, IL (US)

(72) Inventors: Edward Barkan, Miller Place, NY (US); Mohannad Abdo, Clifton, NJ (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/078,627

(22) Filed: Dec. 9, 2022

(65) Prior Publication Data

US 2024/0193388 A1 Jun. 13, 2024

(51) Int. Cl.
*G06K 7/14* (2006.01)
*G06K 7/10* (2006.01)

(52) U.S. Cl.
CPC ....... *G06K 7/1413* (2013.01); *G06K 7/10722* (2013.01); *G06K 7/10881* (2013.01); *G06K 2007/10524* (2013.01)

(58) Field of Classification Search
CPC ............. G06K 7/1413; G06K 7/10722; G06K 7/10881; G06K 2007/10524
See application file for complete search history.

(56) References Cited

U.S. PATENT DOCUMENTS

| | | |
|---|---|---|
| 2016/0292486 A1 | 10/2016 | Prusik et al. |
| 2021/0034831 A1 | 2/2021 | Abdo et al. |
| 2021/0034933 A1 | 2/2021 | Abdo et al. |
| 2022/0027912 A1* | 1/2022 | Chaum ................ G06Q 20/409 |
| 2022/0318583 A1 | 10/2022 | Nudel et al. |
| 2023/0385573 A1 | 11/2023 | Morley-Smith et al. |

FOREIGN PATENT DOCUMENTS

WO WO-2022051210 A1 * 3/2022 ......... G01N 15/0612

* cited by examiner

*Primary Examiner* — Matthew Mikels

(57) ABSTRACT

Imaging devices, systems, and methods for determining parameters of an object based on chemical indicators detected during a decode event are described herein. An example device includes: a housing; one or more processors; an imaging assembly at least partially disposed within the housing, the imaging assembly including: an imaging sensor operable to capture an image of an object in a FOV; and a computer-readable media storing machine readable instructions that, when executed, cause the one or more processors to: after capturing the image of the object in the FOV, determine whether a decode indicia is present in the image of the object; initiate a decode event for the decode indicia present in the image of the object; detect a chemical indicator in proximity to the decode indicia in the image of the object; and determine, based on the chemical indicator, one or more parameters associated with the object.

19 Claims, 9 Drawing Sheets

BARCODE WITH BUILT-IN CHEMICAL INDICATORS

BACKGROUND

Barcode reading systems have long been used to capture barcode data, which is then used to look up the price of the item read. Further, barcode reading systems also often utilize machine vision techniques to improve scanning and/or perform related tasks, such as item and/or characteristic recognition. However, traditional barcode reading systems are limited to external characteristics of a product. In particular, if defects exist for an object that do not lead to physical deformations in the object, traditional barcode reading systems often have little to no recourse in identifying problems, and instead rely on manual inspection by a human employee, introducing the risk of human error.

Further, while some products include indications of expiration, such expiration relies solely on a specified date determined using an assumed environment. Therefore, such indications may not reflect the reality of the individual object, leading to further potential error. Traditional systems and methods have no ability to automatically determine in what environmental conditions an object was previously kept and whether any such environmental factors have exacerbated the expiration date for the object in question.

As such, a system that is able to indicate and/or identify past environmental exposure factors in an object is desired.

SUMMARY

In an embodiment, an imaging device for determining parameters of an object based on chemical indicators detected during a decode event is provided. The imaging device includes: a housing; one or more processors; and an imaging assembly at least partially disposed within the housing, the imaging assembly including: an imaging sensor operable to capture an image of an object in a field of view (FOV). The system further includes a computer-readable media storing machine readable instructions that, when executed, cause the one or more processors to: (i) after capturing the image of the object in the FOV, determine whether a decode indicia is present in the image of the object; (ii) initiate a decode event for the decode indicia present in the image of the object; (iii) detect a chemical indicator in proximity to the decode indicia in the image of the object; and (iv) determine, based on the chemical indicator, one or more parameters associated with the object.

In a variation of the embodiment, detecting the chemical indicator includes: detecting a marker indicative of a position of the chemical indicator; and searching the position indicated by the marker to determine whether the chemical indicator is present.

In another variation of the embodiment, the marker is an arrow pointing to the position of the chemical indicator, and searching the position includes: determining a path to the chemical indicator based on the arrow; and searching along the path until the chemical indicator is detected or an end of the path is detected.

In yet another variation of the embodiment, the marker is one of a plurality of shapes, wherein each of the plurality of shapes is indicative of a different position for the chemical indicator.

In still yet another variation of the embodiment, the marker is at least one digit in a UPC code associated with the decode indicia.

In another variation of the embodiment, the at least one digit is representative of a point of origin that uses chemical indicators, and wherein detecting the chemical indicator includes: determining, based on the at least one digit, that a chemical indicator may be present; and searching for the chemical indicator responsive to determining that the chemical indicator may be present.

In yet another variation, the one or more parameters associated with the object includes at least one of: (i) a temperature of the object, (ii) a humidity of the object, (iii) a sunlight exposure of the object, (iv) a chemical exposure of the object, (v) a lifetime of the object, or (vi) an expiration status of the object.

In still yet another variation, determining the one or more parameters includes: determining that at least one of a coloring or a shading of the chemical indicator has changed from a default state; and based on the determining that the at least one of the coloring or the shading of the chemical indicator has changed, determining that a parameter of the one or more parameters associated with the chemical indicator has passed a predetermined threshold.

In a further variation of the embodiment, determining that the at least one of the coloring or the shading of the chemical indicator has changed from the default state includes: comparing the at least one of the coloring or the shading of the chemical indicator to a coloring or a shading of the decode indicia to generate a color comparison; and determining, based on the color comparison, that the at least one of the coloring or the shading of the chemical indicator has changed from the default state.

In yet another variation, determining the one or more parameters includes: determining that at least one of a coloring or a shading of the chemical indicator has changed from a default state; and based on the at least one of the coloring or the shading of the chemical indicator, determining a current state of a parameter of the one or more parameters associated with the chemical indicator.

In a further variation of the embodiment, determining that the at least one of the coloring or the shading of the chemical indicator has changed from the default state includes: comparing the at least one of the coloring or the shading of the chemical indicator to a coloring or a shading of the decode indicia to generate a color comparison; and determining, based on the color comparison, that the at least one of the coloring or the shading of the chemical indicator has changed from the default state.

In another variation, the machine readable instructions include instructions that, when executed, further cause the one or more processors to: provide an indication of a status of the one or more parameters to a user.

In a further variation of the embodiment, providing the indication of the status includes: detecting, based on the one or more parameters, a flaw with the object; and alerting the user or a host associated with the imaging device that the object is flawed.

In another further variation of the embodiment, providing the indication of the status includes: detecting, based on the one or more parameters, a potential flaw with the object; and offering a discount to the user based on the potential flaw.

In another embodiment, a method for determining parameters of an object based on chemical indicators detected during a decode event is provided. The method includes: (i) capturing, by one or more processors and at an image sensor of an imaging device, an image of an object in a field of view (FOV); (ii) after capturing the image of the object in the FOV, determining whether a decode indicia is present in the image of the object; (iii) initiating a decode event for the decode indicia present in the image of the object; (iv) detecting a chemical indicator in proximity to the decode indicia in the image of the object; and (v) determining, based on the chemical indicator, one or more parameters associated with the object.

In yet another embodiment, a label that indicates one or more parameters associated with an object is provided. The label includes: a decode indicia identifying an object; (a) one or more chemical indicators proximate to the decode indicia, the one or more chemical indicators indicative of one or more parameters associated with the object; and (b) one or more markers proximate to the decode indicia, the one or more markers indicative of a position for a respective one of the one or more chemical indicators; wherein: (i) the one or more markers cause an imaging device to determine the position for each of the one or more chemical indicators during a scan event; and (ii) the one or more chemical indicators cause the imaging device to determine the one or more parameters associated with the object during the scan event.

In a variation of the embodiment, the one or more markers include an arrow pointing to the position of a respective one of the one or more chemical indicators.

In another variation, the one or more markers include at least one of a plurality of shapes, wherein each of the plurality of shapes is indicative of a different position for the chemical indicator.

In yet another variation, the one or more markers include at least one of a plurality of shapes, wherein each of the plurality of shapes is indicative of a respective chemical indicator of the one or more chemical indicators located within the respective at least one of the plurality of shapes.

In a further variation of the embodiment, each of the plurality of shapes is indicative of a different parameter of the one or more parameters and a color or shading of each respective chemical indicator of the one or more chemical indicators is indicative of a current or past parameter value.

In still yet another variation, the one or more markers include a digit of a UPC code associated with the decode indicia.

In a further variation of the embodiment, the digit of the UPC code is indicative of a point of origin that uses chemical indicators.

In another variation, the one or more markers are located in at least one of: (i) a corner of the decode indicia, (ii) a middle portion of the decode indicia, (iii) above the decode indicia, or (iv) below the decode indicia.

In yet another variation, the one or more chemical indicators are located in at least one of: (i) a corner of the decode indicia, (ii) a middle portion of the decode indicia, (iii) above the decode indicia, or (iv) below the decode indicia.

In still yet another variation, the one or more parameters associated with the object includes at least one of: (i) a temperature of the object, (ii) a humidity of the object, (iii) a sunlight exposure of the object, or (iv) a chemical exposure of the object, (v) a lifetime of the object, or (vi) an expiration status of the object.

In another variation, a color or shading of the chemical indicator is indicative of a current state of a respective parameter of the one or more parameters associated with the chemical indicator.

In a further variation of the embodiment, a change of the color or the shading of the chemical indicator from a default state is indicative that the respective parameter associated with the chemical indicator has passed a predetermined threshold for the respective parameter.

In yet another variation of the embodiment, the decode indicia includes at least one of: (i) a barcode, (ii) a QR code, (iii) an RFID tag, (iv) a digital watermark, (v) a UPC code, or (vi) a data matrix code.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
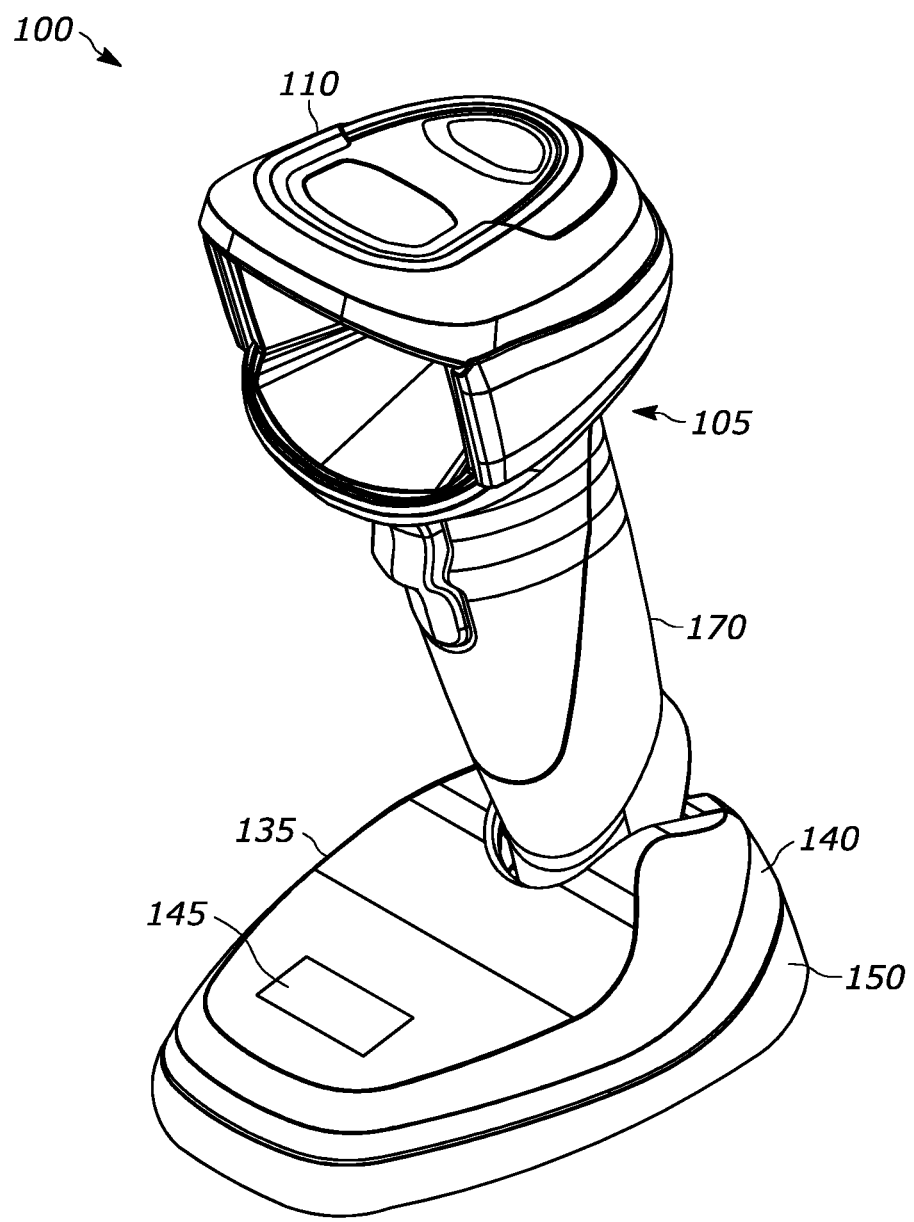
FIG. 1A illustrates a perspective view of a first example handheld imager.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some modern barcode readers incorporate imaging sensors (also referred to herein as "imagers") for reading barcodes and for machine vision purposes, thereby increasing the variety of use cases for such imagers. However, the increased variety of use cases continues to focus around vision-detectable elements for an object, and such imagers do not include systems or methods that allow for the imager to detect nonvisual factors. For example, the environmental factors in which an object was previously stored before being scanned greatly affects the object in question. However, traditional imagers do not possess the means to determine such nonvisual factors unless there is a visual effect on the object in question (e.g., deformation, melting, freezing, etc.).

Similarly, while traditional barcode labels may convey some information to a user and/or an imager (e.g., an expiration date, item identification), such information is determined at the time of printing (often weeks, months, or even years ahead of time), and thus may not prove accurate when the object in question is actually scanned. As such, traditional imagers and barcode labels do not provide a user with a complete and accurate view of the health of an object.

In particular, perishable items (e.g., healthcare, food, cosmetics, dairy, floral, etc.) may have a multitude of factors that affect the item in question that may not be visible to an imager or apparent to a human employee at a point of sale (POS). Further, while some labels may include an indication of an expiration date, such an indication is not indicative of the conditions the object has been exposed to since being printed on the packaging. For example, if a customer removes a package of meat from a freezer and leaves the package on a shelf at room temperature, an employee may return the package even after damage has been done to the meat if the damage is not immediately clear. As such, the meat may then be sold to a customer with no indication that the product is damaged, as the expiration date would indicate that the product is still good and able to be sold.

The example methods, imagers, and barcode labels discussed herein address such concerns by adding chemical indicators for the imager to read and process. The chemical indicators may comprise different chemicals that react to different stimuli in a manner detectable by an imager. For example, when exposed to a particular stimulus, one of the chemical indicators may change color, shading, pattern, etc. to provide a visual indication to the imager of a nonvisual parameter. The chemical indicators may be or include indicators that change when exposed to sunlight, hot temperatures, cold temperatures, other chemicals, radiation, sunlight, humidity, etc. As such, an imager implementing the instant techniques may detect changes that would otherwise go undetected by a traditional imager and/or missed by a human user.

The methods, systems, and techniques discussed herein therefore provide a number of benefits over conventional barcode reading systems. By introducing a chemical indicator to a barcode label and reading the indicator with an imager, the instant techniques reduce inefficiencies in the system by detecting products that may expire ahead of what would otherwise be predicted by a standard expiration date. As such, the system can allow a user to more accurately determine what products to use or sell first, as well as determine which products are safe to offer at a discount when approaching an expiration date. Similarly, the instant techniques reduce expediting expenses and improve the general logistics of moving, storing, and providing sensitive products.

Further, the instant techniques allow a user to improve visibility in a supply chain. Since the chemical indicators are applied at manufacture and/or labeling, any damage due to external factors may be indicated and subsequently detected by an imager.

Figure 1B:
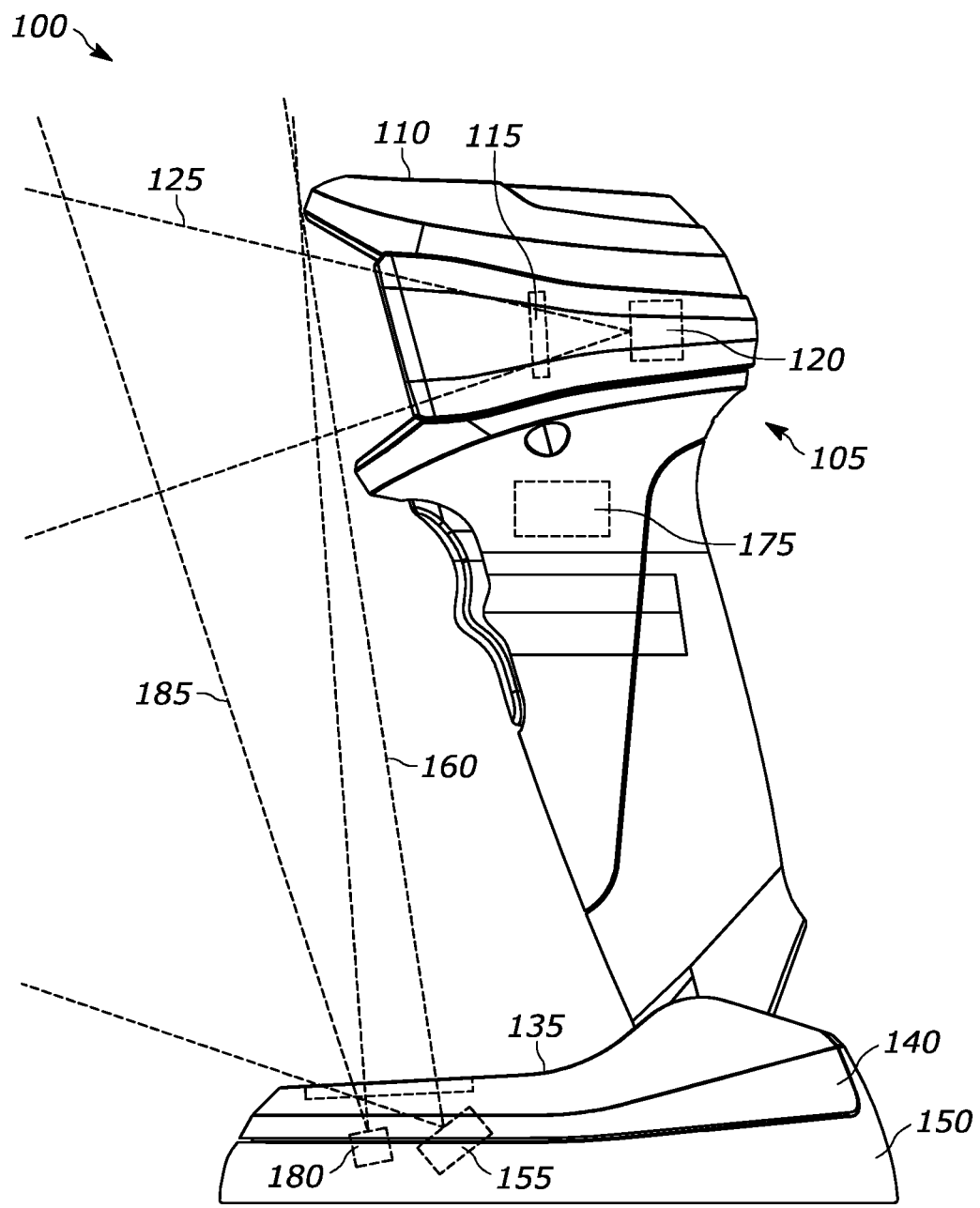
FIG. 1B illustrates a side view of the handheld imager of FIG. 1A.
Figure 1C:
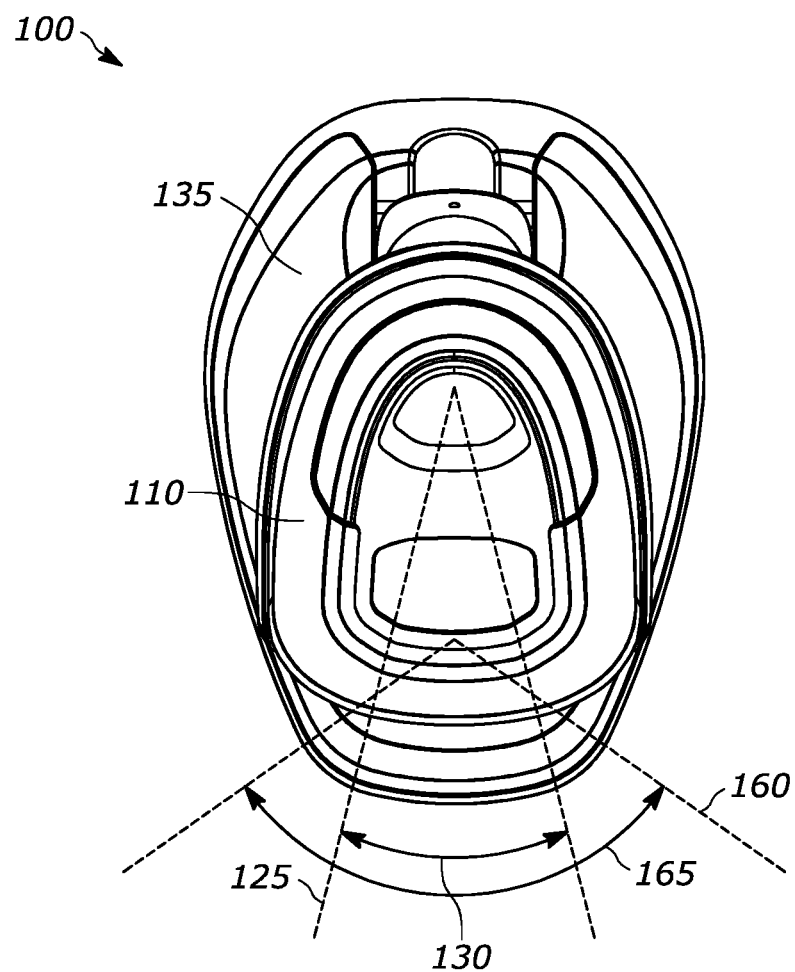
FIG. 1C illustrates a top view of the handheld imager of FIG. 1A.

Referring to FIGS. 1A-1C, an example handheld imager 100 is illustrated. Handheld imager 100 generally includes a housing 105 having a head portion 110 and a base portion 135. Base portion 135 includes an upper portion 140, a lower portion 150 removably attached to upper portion 140, and a base window 145 formed in upper portion 140. While lower portion 150 is shown as being separable from upper portion 140 in a horizontal direction, the separation between lower portion 150 and upper portion 140 could be vertical or in any other direction appropriate for a particular application. In the particular example shown, housing 105 also has a handle portion 170 positioned between head portion 110 and base portion 135 and configured to be grasped by the hand of a user.

A vision camera 155 is positioned within base portion 135 and has a first field-of-view (FOV) 160 that is directed out of base window 145 in upper portion 140 of base portion 135. Preferably, an area adjacent a front of handle portion 170 (e.g., within 10 mm of the front of handle portion 170 or within a finger's width of the front of handle portion 170) is visible in first FOV 160, which can be used to determine if a user is gripping handle portion. In the example shown, vision camera 155 is configured to capture images, such as of the label for an object.

A barcode reading module 120 is positioned at least partially in head portion 110 and has a second FOV 125 that is directed through a scan window 115 in head portion 110 and can at least partially overlap first FOV 160. Depending on the implementation, the barcode reading module 120 and the vision camera 155 may utilize the same lens assembly and/or the same imaging sensor. In other implementations, the barcode reading module 120 and the vision camera 155 may utilize different imaging sensors, such as a monochromatic sensor and a color sensor, respectively.

A controller 175 is also positioned within housing 105 and is in communication with barcode reading module 120 and vision camera 155. Controller 175 is configured to decode process signals from barcode reading module 120 from barcodes that are read by barcode reading module 120 and to receive and process images captured by and received from vision camera 155, as discussed above. In some implementations, controller 175 is also configured to synchronize barcode reading module 120 and vision camera 155 so that vision camera 155 does not capture images when barcode reading module 120 is active or so that both vision camera 155 and barcode reading module 120 capture images in tandem, depending on the implementation. Controller 175 can synchronize barcode reading module 120 and vision camera 155 based on images captured by vision camera 155 or handheld imager 100 could have an optical sensor 180 that is positioned in base portion 135, is in communication with controller 175, and has a third FOV 185 that at least partially overlaps second FOV 125 of barcode reading module 120 to determine when barcode reading module 120 is active. Controller 175 can then be configured to receive signals from optical sensor 180 indicating whether or not barcode reading module 120 is active and synchronize vision camera 155 and barcode reading module 120 based on the signals received from optical sensor 180. Alternatively, controller 175 could be configured to synchronize vision camera 155 and barcode reading module 120 to activate simultaneously so that vision camera 155 can use the same illumination as barcode reading module 120.

As best shown in FIG. 1C, first FOV 160 of vision camera 155 has a horizontal viewing angle 165 that is larger than the horizontal viewing angle 130 of second FOV 125 of barcode reading module 120. For example, horizontal viewing angle 165 of first FOV 160 could be between 80 degrees and 120 degrees and is preferably 100 degrees. In addition, horizontal viewing angle 130 of second FOV 125 could be between 40 degrees and 60 degrees. With horizontal viewing angle 165 of first FOV 160 of vision camera 155 being wider than horizontal viewing angle 130 of second FOV 125 of barcode reading module 120, vision camera 155 can be used as a wake-up system and controller 175 can be configured to turn on barcode reading module 120 when an object is detected in first FOV 160 of vision camera 155, before the object reaches second FOV 125 of barcode reading module 120. This allows barcode reading module 120 to be active as the object enters second FOV 125 and allows more time for barcode reading module 120 to read and decode a barcode on the object.

It will be understood that, although FIG. 1 depicts a handheld imager 100, the use of such is exemplary only, and the techniques described herein may also be implemented with a stationary bioptic imager design and/or any other such barcode reading system design.

Figure 2:
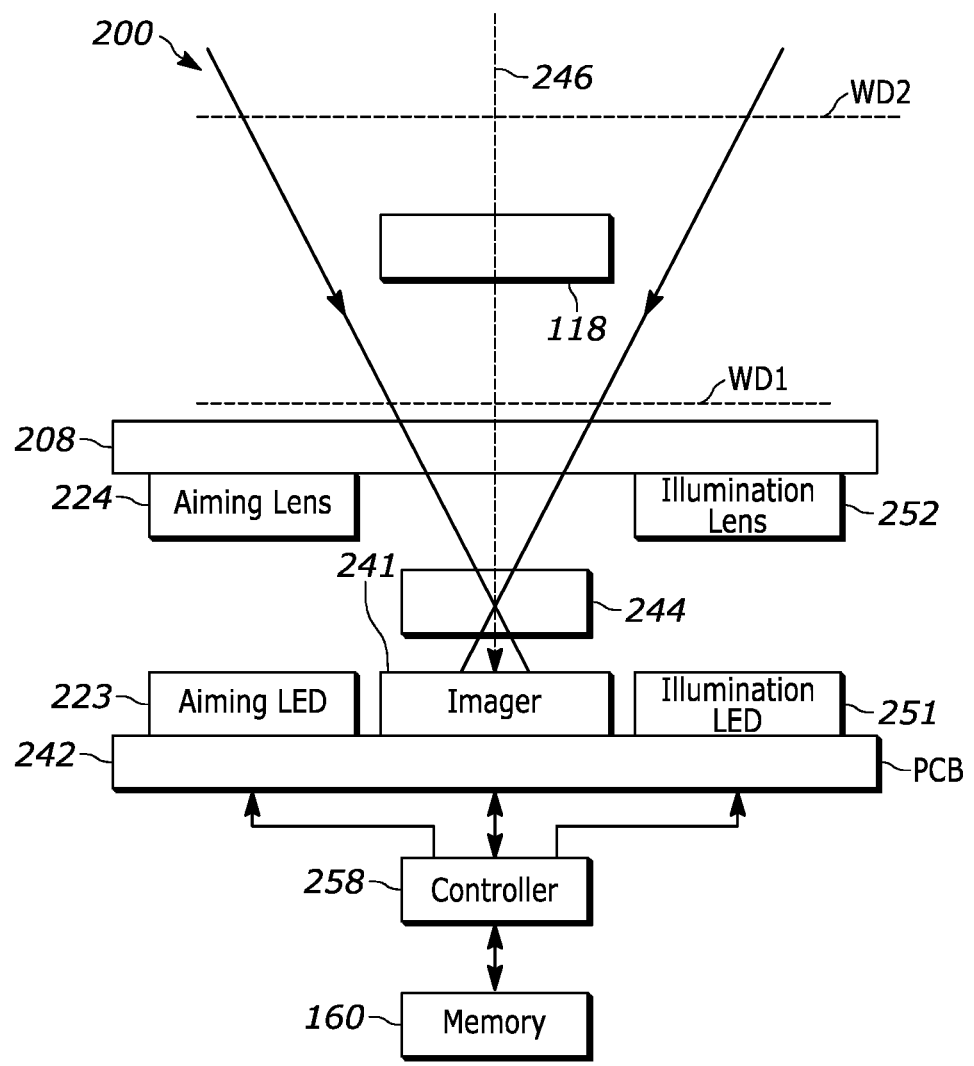
FIG. 2 illustrates a block diagram of an example imaging device such as the example handheld imager of FIG. 1A.

Referring next to FIG. 2, a block diagram of an example architecture for an imaging device such as handheld imager 100 is shown. For at least some of the reader embodiments, an imaging assembly 245 includes a light-detecting sensor or imager 241 operatively coupled to, or mounted on, a printed circuit board (PCB) 242 in the imaging device 200 as shown in FIG. 2. In an embodiment, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 245 over a field of view along an imaging axis 246 through the window 208. The imager 241 may also include and/or function as a monochrome sensor and, in further implementations, a color sensor. It should be understood that the terms "imager", "image sensor", and "imaging sensor" are used interchangeably herein. Depending on the implementation, imager 241 may include a color sensor such as a vision camera in addition to and/or as an alternative to the monochrome sensor. In some implementations, the imager 241 is or includes the barcode reading module 120 (e.g., a monochromatic imaging sensor) of FIGS. 1A-1C. In further implementations, the imager 241 additionally or alternatively is or includes the vision camera 155 (e.g., a color imaging sensor) of FIGS. 1A-1C. It will be understood that, although imager 241 is depicted in FIG. 2 as a single block, that imager 241 may be multiple sensors spread out in different locations of imaging device 200.

The return light is scattered and/or reflected from an object 118 over the field of view. The imaging lens 244 is operative for focusing the return light onto the array of image sensors to enable the object 118 to be imaged. In particular, the light that impinges on the pixels is sensed and the output of those pixels produce image data that is associated with the environment that appears within the FOV (which can include the object 118). This image data is typically processed by a controller (usually by being sent to a decoder) which identifies and decodes decodable indicia captured in the image data. Once the decode is performed successfully, the reader can signal a successful "read" of the object 118 (e.g., a barcode). The object 118 may be located anywhere in a working range of distances between a close-in working distance (WD1) and a far-out working distance (WD2). In an embodiment, WD1 is about one-half inch from the window 208, and WD2 is about thirty inches from the window 208.

An illuminating light assembly may also be mounted in, attached to, or associated with the imaging device 200. The illuminating light assembly includes an illumination light source 251, such as at least one light emitting diode (LED) and at least one illumination lens 252, and preferably a plurality of illumination and illumination lenses, configured to generate a substantially uniform distributed illumination pattern of illumination light on and along the object 118 to be imaged by image capture. Although FIG. 2 illustrates a single illumination light source 251, it will be understood that the illumination light source 251 may include more light sources. At least part of the scattered and/or reflected return light is derived from the illumination pattern of light on and along the object 118.

An aiming light assembly may also be mounted in, attached to, or associated with the imaging device 200 and preferably includes an aiming light source 223, e.g., one or more aiming LEDs or laser light sources, and an aiming lens 224 for generating and directing a visible aiming light beam away from the imaging device 200 onto the object 118 in the direction of the FOV of the imager 241.

Further, the imager 241, the illumination source 251, and the aiming source 223 are operatively connected to a controller or programmed microprocessor 258 operative for controlling the operation of these components. Depending on the implementation, the microprocessor 258 is the controller 170 as described above with regard to FIGS. 1A-1C. In some implementations, the microprocessor 258 functions as or is communicatively coupled to a vision application processor for receiving, processing, and/or analyzing the image data captured by the imagers.

A memory 160 is connected and accessible to the controller 258. Preferably, the microprocessor 258 is the same as the one used for processing the captured return light from the illuminated object 118 to obtain data related to the object 118. Though not shown, additional optical elements, such as collimators, lenses, apertures, compartment walls, etc. may be provided in the housing. Although FIG. 2 shows the imager 241, the illumination source 251, and the aiming source 223 as being mounted on the same PCB 242, it should be understood that different embodiments of the imaging device 200 may have these components each on a separate PCB, or in different combinations on separate PCBs. For example, in an embodiment of the imaging device 200, the illumination LED source is provided as an off-axis illumination (i.e., has a central illumination axis that is not parallel to the central FOV axis).

In some implementations, the object 118 is or includes an indicia for decoding (e.g., a decode indicia), such as a barcode (e.g., a Code39 barcode, a Code128 barcode, etc.), a QR code, a label, a UPC code, a digital matrix code, etc. In further implementations, the object 118 is or includes a digital watermark, the digital watermark may include a plurality of repeating barcodes, product codes, code patterns, or other such indicia that comprise the digital watermark. In some such implementations, the digital watermark is invisible or near-invisible to the human eye but is able to be detected and/or imaged by an imaging device 200.

Referring to FIGS. 3A-3D, example barcode labels 300A, 300B, 300C, and 300D (collectively 300A-D) are illustrated. Each example barcode label 300A-D includes one or more chemical indicators indicative of one or more parameters for an object (e.g., object 118) upon which the label is applied. Depending on the implementation, the barcode 310A-D may be a 1D barcode with or without a UPC number. In further implementations, the barcode 310A-D may alternatively be a 2D barcode (e.g., a QR code, data matrix code, etc.), an RFID tag, and/or any other similar decode indicia that a scanning system may use to identify the object 118. Similarly, the barcode labels 300A-D may include one or more markers and/or chemical indicators as described herein. Depending on the implementation, the markers and/or chemical indicators may be located immediately adjacent to the barcode 310A-D, in a boundary (e.g., a main body) of the barcode 310A-D, in a corner of the barcode 310A-D, etc. In implementations in which the barcode 310A-D is a 2D barcode, the markers and/or chemical indicators may be located in an unused portion of the 2D barcode (e.g., in a center block of a QR code, etc.). In implementations in which the barcode 310A-D is a 1D barcode, the markers and/or chemical indicators may be located across the main body of the barcode 310A-D so long as at least one strip of the barcode 310A-D remains uninterrupted from the left side to the right side for an imaging device (e.g., imaging device 200) to scan, decode, and/or otherwise read.

Figure 3A:
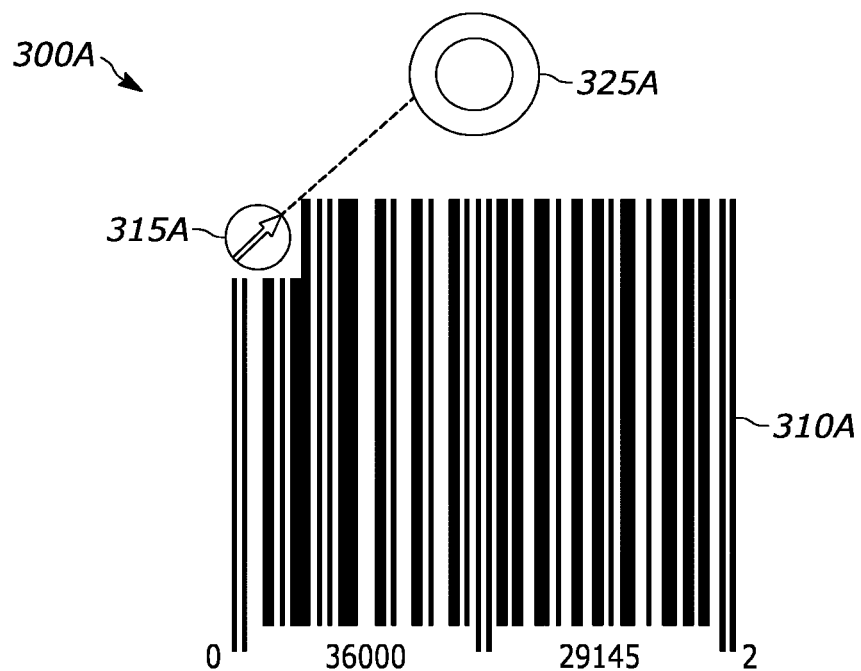
FIG. 3A illustrates an example barcode label including a chemical indicator and a marker denoting a location of the chemical indicator.

Referring to FIG. 3A, barcode label 300A includes at least a barcode 310A, a marker 315A, and a chemical indicator 325A. Although the exemplary embodiment of FIG. 3A includes a single marker 315A and a single chemical indicator 325A, it will be understood that the barcode label 300A may include any appropriate number of markers and/or chemical indicators. Depending on the implementation, the barcode label 300A may include an equal number of markers and chemical indicators (e.g., each marker refers to a single chemical indicator) or a differing number of markers and chemical indicators (e.g., a marker may refer to multiple chemical indicators, multiple markers may provide information regarding a single chemical indicators, etc.). Similarly, as described above, the barcode 310A may be a barcode, QR code, data matrix code, and/or any other similar decode indicia.

The barcode label 300A includes a marker 315A. In the exemplary embodiment of FIG. 3A, the marker 315A is or includes an arrow. In some implementations, the arrow on the marker 315A indicates a direction to an imaging device (e.g., imaging device 200) in which the imaging device 200 will find the chemical indicator 325A. In further implementations, the arrow on the marker 315A and/or another component of the marker 315A indicates a distance from the marker to the chemical indicator 325A. As such, when decoding the barcode 310A, an imaging device 200 may detect the marker 315A, determine a location and/or direction for the chemical indicator 325A based at least on the marker 315A, and determine parameters for the object (e.g., object 118) to which the label 300A is applied based on the chemical indicator.

Depending on the implementation, an imaging device 200 may detect a marker 315A during, before, and/or after a scan event. For example, while scanning the barcode 310A, an imaging device 200 may detect the marker 315A and may determine a shape, number, letter, etc. present as part of the marker 315A. Depending on the implementation, the imaging device 200 may determine components of the marker 315A based on OCR techniques (e.g., to recognize the shape), based on reflected light, based on pixel analysis of an image taken of the label 300A, etc.

In some implementations, the marker 315A indicates the direction and/or location in which the chemical indicator 325A is located based on the direction in which the arrow points. For example, in the exemplary embodiment of FIG. 3A, the arrow in marker 315A points directly at the chemical indicator 325A. As such, an imaging device 200 may detect the marker 315A and may determine a shape of the arrow. After determining the shape for the arrow, the imaging device 200 may determine a direction in which the arrow points. In some implementations, the imaging device 200 determines a number of degrees rotation within a circle the arrow is from the top of the marker 315A. For example, in the exemplary embodiment of FIG. 3A, the arrow in marker 315A is approximately 45 degrees from the top of the circle that makes up the bounds of marker 315A. In other implementations, the imaging device 200 may compare the arrow design or direction to an internal lookup table or other stored memory to determine a location and/or direction for the chemical indicator 325A. The imaging device 200 may then search for the chemical indicator as described in more detail below with regard to FIGS. 4-6.

Depending on the implementation, the chemical indicator may be any appropriate shape, color, size, etc. In some implementations, the chemical indicator is printed with a chemical that causes the indicator to be clear until an outside source of stimulus causes the indicator to change to a visible color. Alternatively, the chemical indicator changes from one color to another when in response to the outside source of stimulus, from a color to no color (e.g., clear), from a lighter color to a deeper color, from a deeper color to a lighter color, etc. Depending on the implementation, the chemical indicator 325A may change based on (and therefore indicate) a change to any of exposure to sunlight, radiation, chemicals, hand oil, excessive heat, excessive cold, time, etc. to represent potential damage to the object 118. As such, the chemical indicator 325A may indicate to an imaging device 200 that an item has passed an expiration date or safe temperature (e.g., with a Temptime® indicator), a safe exposure threshold to radiation, a safe exposure threshold to other chemicals, etc. Similarly, depending on the implementation, the chemical indicator may change colors all at once after passing a threshold, gradually over time or in proportion to exposure and/or severity (e.g., to represent the level of damage to the object 118), etc.

Figure 3B:
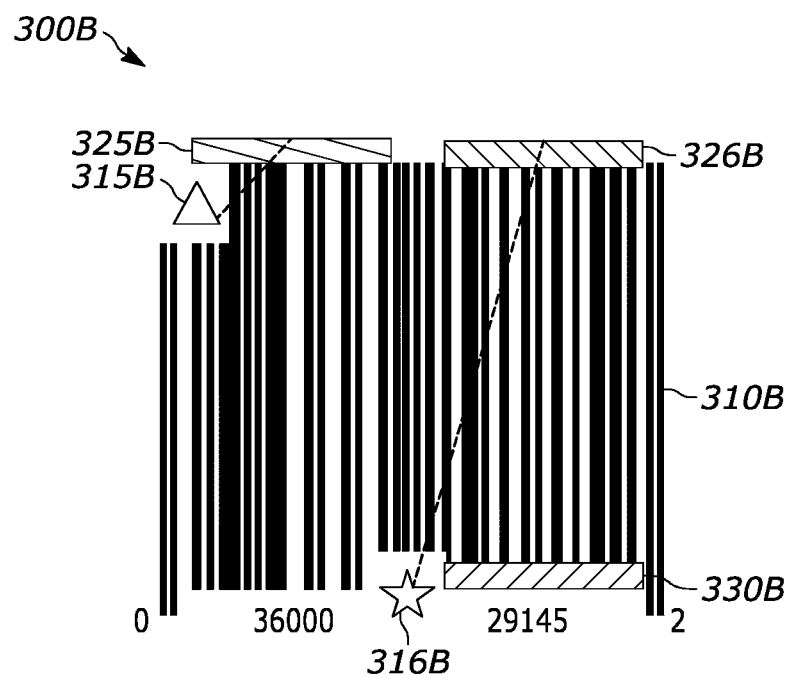
FIG. 3B illustrates another example barcode label including multiple chemical indicators adjacent to the barcode and multiple markers denoting the location of the chemical indicators.

Referring to FIG. 3B, barcode label 300B is similar to barcode label 300A and includes at least a barcode 310B, a marker 315B, and a chemical indicator 325B. In addition, the barcode label 300B includes a second marker 316B, a corresponding second chemical indicator 326B, and a third chemical indicator 330B.

In some implementations, the markers 315B and 316B may be different shapes, sizes, colors, etc. and may indicate different chemical indicators 325B and 326B, different parameters or information regarding the chemical indicators, etc. Depending on the implementation, the markers 315B and 316B may be a circle, a square, a triangle, a star, and/or any other such shape that imaging device 200 is able to recognize and distinguish from other shapes. Similarly, the markers 315B and 316B may be a letter, a number, a pattern, and/or any other such recognizable character(s).

The markers 315B and 316B may indicate a location to an imaging device (e.g., imaging device 200). In some implementations, the shape, size, color, and/or some other characteristic of the markers 315B and 316B indicate to the imaging device 200 a precise location of the respective chemical indicator(s) 325B and 326B. In other implementations, the markers 315B and 316B indicate to the imaging device 200 a location relative to the marker 315B or 316B, the barcode 310B, the edges of the label 300B, and/or any other consistent feature of the label 300B. In still other implementations, the markers 315B and 316B indicate to the imaging device 200 a general direction to search (e.g., above the barcode 310B, below the barcode 310B, etc.).

In some implementations, the imaging device 200 compares the chemical indicators 325B, 326B, and/or 330B to another feature of the barcode label 300B to determine whether the chemical indicators 325B, 326B, and/or 330B are another color besides black, white, or clear. For example, the imaging device 200 may compare any or all of chemical indicators 325B, 326B, and/or 330B to the barcode 310B to contrast the coloring of the chemical indicators 325B, 326B, and/or 330B and the coloring of the barcode 310B. In some such implementations, the chemical indicators 325B, 326B, and/or 330B are located directly adjacent to the component of the barcode label 300B to better allow the imaging device 200 to determine the contrast in color.

In further implementations, the imaging device 200 searches for additional chemical indicator(s) 330B after determining parameters for the chemical indicators 325B and 326B. Depending on the implementation, the imaging device 200 may search for the additional chemical indicator (s) 330B based on an indication from the markers 315B and/or 316B, from the chemical indicators 325B and/or 326B, etc. In further implementations, the imaging device 200 performs the additional search automatically after detecting any markers 315B and/or 316B or chemical indicators 325B and/or 326B. In still further implementations, the imaging device 200 always performs the additional search. Depending on the implementation, the imaging device 200 may search from right to left, top to bottom, right to left, bottom to top, starting in the center and working out, starting at the edges and working in, etc.

Figure 3C:
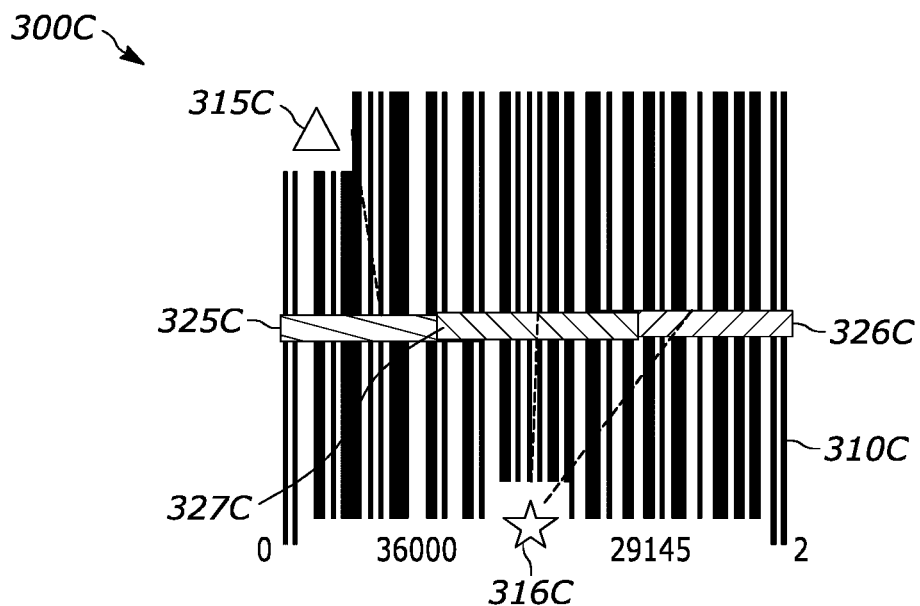
FIG. 3C illustrates another example barcode label including multiple chemical indicators placed across the barcode and multiple markers denoting the location of the chemical indicators.

Referring next to FIG. 3C, barcode label 300C is similar to barcode label 300B and includes at least a barcode 310C, markers 315C and 316C, and chemical indicators 325C and 326C. Similarly to the barcode label 300B, barcode label 300C includes a third chemical indicator 327C, but in the exemplary embodiment of FIG. 3C, the marker 316C indicates positioning for both the second chemical indicator 326C and the third chemical indicator 327C. In some implementations, the shape of a marker 316C may indicate to an imaging device (e.g., imaging device 200C) particular location information, parameters, and/or other such characteristic data for multiple chemical indicators 326C and 327C. In further implementations, the shape of the marker 316C may include multiple arrows, multiple shapes, and/or another such indication of positioning or characteristic data as described herein. Depending on the implementation, the positioning for each chemical indicator 325C, 326C, and/or 327C may be in the main body of the barcode 310C so long as a consistent horizontal strip across the body of the barcode 310C remains clear for the imaging device 200 to scan.

Figure 3D:
FIG. 3D illustrates another example barcode label including multiple chemical indicators located in the corners of the barcode, each indicating a different parameter status.

Referring next to FIG. 3D, barcode label 300D is similar to barcode labels 300A-C and includes at least a barcode 310C and multiple markers and chemical indicators. In the exemplary embodiment of FIG. 3D, however, the markers and the chemical indicators are combined, and the barcode label 300D therefore has a temperature and time (e.g., Temptime®) chemical indicator 322D, a humidity chemical indicator 324D, a sunlight chemical indicator 326D, and a chemical exposure chemical indicator 328D (collectively chemical indicators 320D). As such, each of the chemical indicators 320D is automatically detected when an imaging device (e.g., imaging device 200) detects the markers, since the chemical indicators 320D are included as components of the respective markers.

In some implementations of any of FIGS. 3A-3D, a UPC code, GSI code, or any other equivalent or similar numerical code associated with the barcode 310A-D indicates the location of the chemical indicator(s) to the imaging device 200. For example, depending on the implementation, the UPC code may include a digit that indicates whether the barcode label 300A-D includes a chemical indicator or not. Additionally or alternatively, the digit(s) may indicate a particular position for the chemical indicator(s), one or more parameters with which the chemical indicator(s) are associated, rules governing the chemical indicator(s) (e.g., what color represents passing a threshold, whether the chemical indicator changes color at a threshold or changes more in accordance with the severity of exposure, etc.), and/or any other such indication that a marker may provide to the imaging device 200 as generally described herein.

In still further implementations, the digit(s) indicate to the imaging device 200 a point of origin for the object (e.g., a manufacturer, labeler, retailer, and/or other such company of origin). The imaging device 200 may determine whether the point of origin uses chemical indicators on barcode labels and may subsequently determine whether to search for a chemical indicator and/or expect a chemical indicator based on the point of origin. In some implementations, the imaging device 200 determines whether the point of origin uses chemical indicators by comparing the digit(s) to an internal table including a binary indication of whether the point of origin uses the indicators. In further implementations, the imaging device 200 makes the determination by comparing the digit(s) to an internal table including an indication of where the point of origin places chemical indicators, if at all. In still further implementations, the imaging device 200 stores indications of which point of origin digit(s) correspond to chemical indicators and trains a machine learning algorithm to determine which points of origin use chemical indicators.

In further implementations, the imaging device 200 may make the determination using one or more digits indicative of a particular item. The imaging device 200 may make such a determination using any of the techniques as described above. Similarly, the imaging device 200 may implement any other similar technique for determining whether a barcode label 300A-D includes a chemical indicator based on a numerical code such as a UPC code, a GSI code, etc. For example, the imaging device 200 may make the determination based on a supplemental code of digits that indicate the information as described above.

Depending on the implementation, the label 300A-D may additionally or alternatively include an additional barcode to indicate whether the barcode label includes a chemical indicator. In such implementations, the initial barcode may include an indication (e.g., in the barcode data, in numerical code digits, etc.) of the presence of the second barcode. The imaging device 200 may then determine to scan and read the second barcode, which may include an indication of where the chemical indicator is. In some implementations, the second barcode is the chemical indicator and appears on the label 300A-D when the product is exposed to certain environmental factors as described herein. In such implementations, the second barcode may, when decoded, include instructions for the imaging device 200.

Depending on the implementation, the label 300A-D may be printed such that the chemical indicators are of the same medium as the barcode. For example, a printer using chemical ink may print the chemical indicators before, during, or after printing the remainder of the label 300A-D. Depending on the implementation, the chemical indicators may be activated by pressure, UV light, etc. As such, the label 300A-D may be printed with any such appropriate and chemically-reactive ink.

Figure 4:
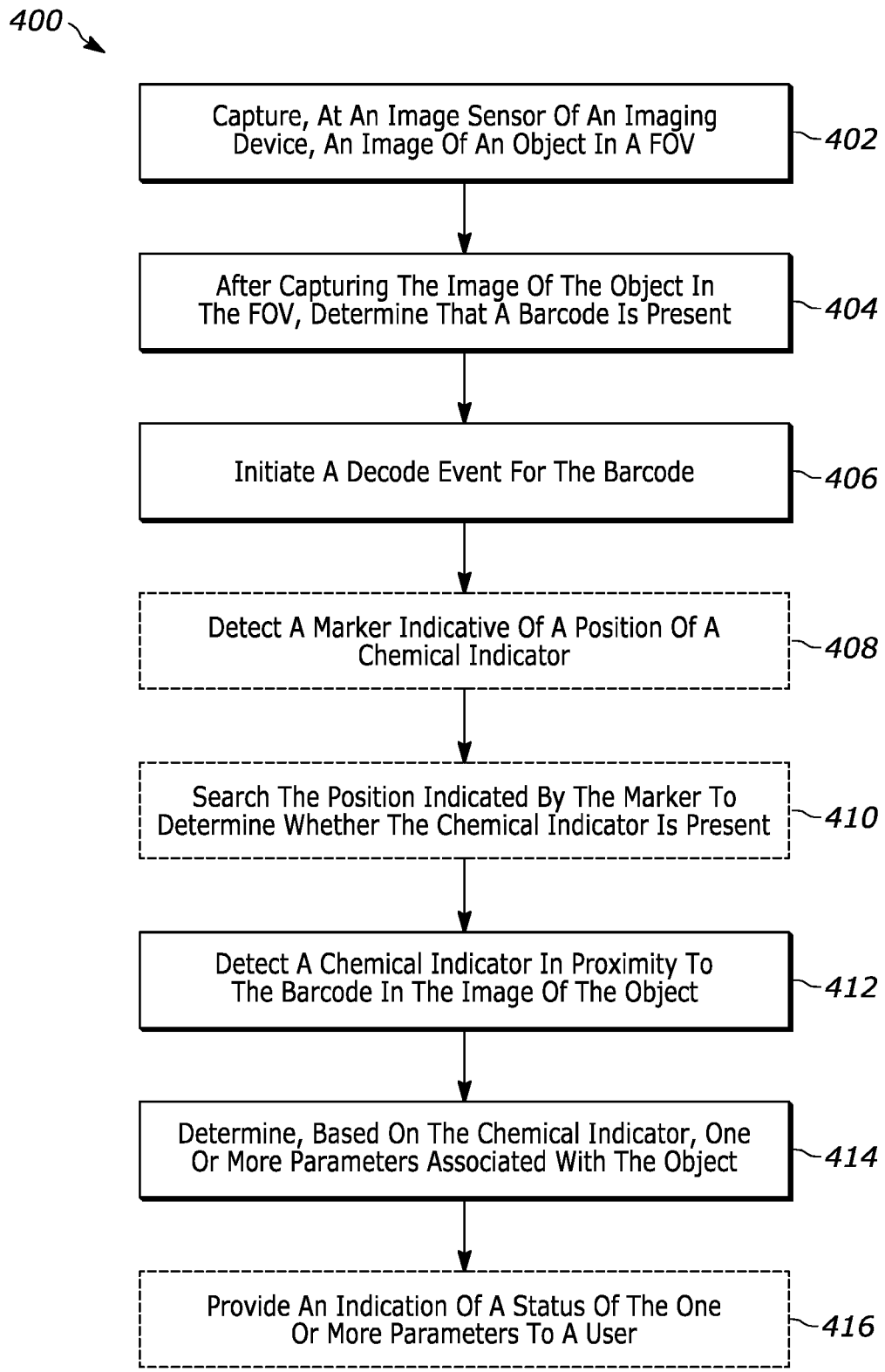
FIG. 4 illustrates a flow diagram of an example method for determining parameters of an object based on chemical indicators detected during a decode event.

Referring next to FIG. 4, the method 400 illustrates a flow diagram of an example method for determining parameters of an object based on chemical indicators detected during a decode event. Although the method 400 is described below with regard to imaging device 200 and components thereof as illustrated in FIG. 2, it will be understood that other similarly suitable imaging devices and/or components may be used instead.

At block 402, the imaging device 200 captures an image of an object (e.g., object 118) in a FOV. In some implementations, the imaging device 200 captures the image of the object by illuminating the object 118 using an illumination light source 251 and receiving reflected light at a barcode scanning module, a video camera, and/or other imaging sensor 241 as described herein. In some implementations, the imaging device 200 captures a series of images (e.g., in a video or image stream). In such implementations, the image of the object may be a single frame or image of the stream or multiple frames or images of the stream.

At block 404, the imaging device 200 determines whether a decode indicia is present in the image. In some implementations, the imaging device 200 detects the presence of a decode indicia in the image captured at block 402. In further implementations, the imaging sensor 241 detects whether the decode indicia is present separate from the captured image by receiving reflected light from the decode indicia as described herein. In some implementations, the imaging sensor 241 is the same imaging sensor for both capturing the image and detecting the presence of the decode indicia. In other implementations, the imaging sensors 241 includes multiple sensors, and each sensor performs a different action as noted above with regard to blocks 402 and 404. In some implementations, the imaging device 200 begins scanning for a decode indicia in response to or after capturing the image of the object 118. In other implementations, the imaging device 200 captures the image responsive to detecting the decode indicia.

At block 406, the imaging device 200 initiates a decode event for the decode indicia. In some implementations, the imaging device 200 performs the entire decode event normally and performs blocks 408-416 subsequently to finishing the decode event. In further implementations, the imaging device 200 interrupts the decode event upon detecting the marker at block 408, detecting the chemical indicator at block 412, etc. In such implementations, the imaging device 200 performs blocks 408-416 and may stop the remainder of the decode event, perform the remainder of the decode event after finishing the blocks 408-416, performs a portion of blocks 408-416 before performing the remainder of the decode event, etc. In still further implementations, the imaging device 200 detects the marker, chemical indicator, etc. and performs at least some of blocks 408-416 in parallel with the decode event.

It will be understood that, although the decode event initiation occurs at block 406, the blocks of method 400 may occur in any order unless explicitly noted to the contrary herein. In some implementations, for example, the decode event initiation at block 406 may occur after determining the one or more parameters at block 414.

At block 408, the imaging device 200 may detect a marker indicative of a position of a chemical indicator. In some implementations, the imaging device 200 may detect the marker while performing the decode event, after the decode event is complete, or before initiating the decode event, as described with regard to block 406 above. Depending on the implementation, the marker may be a simple shape (e.g., a circle, a triangle, a square, a star, etc.), an arrow, a number, a letter, or any other similar marking. In some implementations, the marker may be located in proximity to the decode indicia. Depending on the implementation, the marker may be in proximity to the decode indicia when the marker is overlaid with the decode indicia, directly adjacent to the decode indicia, within 3 inches of the decode indicia, etc.

For example, when the decode indicia is a 1D barcode, the marker may be located in a corner of the barcode, along the bottom of the barcode, along the top of the barcode, within a boundary of the barcode, etc. When the decode indicia is a 2D barcode (e.g., a QR code, data matrix code, etc.), the marker may be located in a dead space (e.g., a portion of the decode indicia without relevant data encoded), such as in the center, of the 2D barcode; in a corner of the 2D barcode; along a side of the 2D barcode; etc.

In some implementations, the imaging device 200 detects the marker using optical character recognition (OCR) techniques. In such implementations, the imaging device 200 may determine what the shape, letter, number, etc. is by analyzing pixels of the captured image. In further such implementations, the imaging device 200 compares the marker to a database including absolute coordinates, relative coordinates, and/or any other such positional identifier and determines a location of a chemical indicator based on the output of the database, using the marker as an input. In further implementations, the marker may be indicative of multiple chemical indicators and/or chemical indicator positions. In still further implementations, the marker may be indicative of both the location of the chemical indicator as well as the respective parameter to which the chemical indicator corresponds.

For example, a triangle marker may indicate to the imaging device 200 that a first chemical indicator representing humidity may be located in a position X, and a star marker may indicate to the imaging device 200 that a second chemical indicator representing temperature and a third chemical indicator representing exposure to sunlight are located at positions Y and Z, respectively. As an alternate example, the triangle may indicate that the first chemical indicator is located at position X and the star may indicate that the second and third chemical indicators are located at positions Y and Z without indicating the nature of the parameters corresponding to the chemical indicators.

At block 410, the imaging device 200 may search the position indicated by the marker to determine whether the chemical indicator is present. In some implementations, the marker is indicative of a broader area (e.g., a quadrant, a portion of the barcode, a distance range, etc.), and the imaging device 200 searches the area until detecting the chemical indicator. In further implementations, the imaging device 200 broadens the search if the chemical indicator is not found. In other implementations, the imaging device 200 only searches the indicated area and, if the imaging device 200 does not find the chemical indicator, determines that a chemical indicator is not present or is undetectable. In still other implementations, the marker may indicate simply that a chemical indicator is present, and may therefore indicate the entire label or barcode as the position.

In further implementations, the imaging device 200 provides feedback to a user if a marker is detected but a chemical indicator is not. Depending on the implementation, the imaging device 200 may display an error message if the chemical indicator is meant to always be visible to the imaging device 200. In some such implementations, the imaging device 200 and/or an associated computing device may determine that the lack of chemical indicator suggests an attempt to deface, steal, or otherwise damage the object. In further such implementation, the imaging device 200 and/or an associated computing device may determine that the lack of chemical indicator suggests a damaged product, and may warn a user that the object is damaged.

At block 412, the imaging device 200 detects a chemical indicator in proximity to the decode indicia in the image of the object. Depending on the implementation, the chemical indicator may be located on a shared label with the decode indicia (e.g., as illustrated by FIG. 3A), adjacent to the decode indicia (e.g., as illustrated by FIG. 3B), within a main body of the decode indicia (e.g., as illustrated by FIG. 3C), in a corner of the decode indicia (e.g., at illustrated by FIG. 3D), in an unused space of the decode indicia (e.g., in a center of a 2D barcode such as a QR code), etc.

In some implementations, the imaging device 200 detects the chemical indicator based on the color or shading. For example, the imaging device 200 may determine that a chemical indicator is present when the imaging device 200 detects a particular color. In some implementations, the marker indicates to the imaging device 200 what color or shading the chemical indicator includes. In further implementations, the imaging device 200 detects a color or shading that contrasts with the decode indicia and determines that the chemical indicator is present. The imaging device 200 may determine that the chemical indicator has a contrast with the decode indicia by comparing pixels of the chemical indicator and pixels of the decode indicia have contrasting saturation values, hue values, RGB values, etc. In some such implementations, the chemical indicators may be located directly adjacent to or within the decode indicia to better facilitate the determination and detection of the chemical indicator(s).

At block 414, the imaging device 200 determines one or more parameters associated with the object. Depending on the implementation, the parameter(s) may include a temperature of the object, a (sun)light exposure of the object, a humidity exposure of the object, a chemical exposure of the object, or any other potentially damaging change. In some implementations, the chemical indicator(s) may also include and/or be indicative of a temporal component, a lifetime of the object, an expiration status of the object, etc. For example, a chemical indicator for temperature of a product may be a Temptime® indicator, and may indicate how long an object has been held at a particular temperature.

In some implementations, the imaging device 200 determines the one or more parameters based on the color or shading of the chemical indicator(s). In particular, the color or shading of the chemical indicator(s) may change color or shading in response to changes in environment, changes directly impinging upon the object 118, temporal progression, and/or any other similar factors that may alter the state of the object 118 and/or anything contained within the object 118. For example, the chemical indicator(s) may change color or shading when exposed to sunlight, radiation, chemicals, excessive heat, excessive cold, etc. to represent potential damage to the object 118. Similarly, the chemical indicator(s) may change color or shading to indicate that the object 118 has been left in an environment for too long and therefore been damaged, such as groceries being left at room temperature and spoiling.

In some implementations, the color or shading of the chemical indicator(s) may change when a predetermined threshold is reached. For example, the color or shading may change if any amount sunlight reaches the chemical indicator, or if the temperature of the object 118 ever reaches above freezing. In some such implementations, the color or shading of the marker changes upon reaching the threshold and does not change back. As such, the change in color or shading may be an indication that the object 118 has been exposed to adverse conditions at any point in a lifecycle.

In further implementations, the color or shading of the chemical indicator(s) changes gradually in accordance with the severity of the environmental factors. For example, the color or shading may start as white, but may shift to a light shade of blue upon being exposed to the environmental factors, and may deepen the shade of blue over time to indicate how severe the exposure is. For example, groceries that keep best at a particular temperature range (e.g., cooled) and for a particular time period may slowly turn blue starting an hour, day, week, etc. before the end of the time period and/or starting a minute, hour, day, etc. after being removed from the particular temperature range. A slightly blue tinge may indicate negligible damage, and thus an imaging device 200 may determine that the object 118 can still be sold, or can be sold at a discount. A deep blue may indicate that the item is damaged, and an imaging device 200 may automatically warn a user that the item is not fit for sale.

Depending on the implementation, the change in color or shading may be a change between colors (e.g., green to red, white to blue, etc.), a deepening in color (e.g., pink to red, light blue to blue, etc.), and/or the presence of a color or lack thereof (e.g., from clear to blue or blue to clear). As such, in some implementations, the imaging device 200 determines the appropriate meaning for a change in color depending on the marker. Depending on the implementation, a marker in the form of a UPC code digit may indicate to the imaging device 200 which company created the product, and therefore what a change in color means. In further implementations, a marker in the form of a shape, symbol, letter, number, etc. may correspond to a type of color or shading change, as described above with regard to determining a position for the chemical indicator.

In some implementations, the imaging device 200 appends the determined parameter information to the end of the decode information from decoding the decode indicia. For example, the decode information may include the decoded material, the UPC code, a type of label (e.g., chemical indicator), a level of damage (e.g., expired, not expired, a week from expiration, etc.), and/or any other determined parameter information.

At block 416, the imaging device 200 provides an indication of a status of the one or more parameters to a user. In some implementations, the imaging device 200 generates and/or provides the indication of status broadly, such as by indicating whether the object 118 is damaged (e.g., expired). For example, the imaging device may emit an audio tone, turn a UI red, display a message on a UI, cause an associated computing device to display a message, send to another location for tracking on a supply chain, etc. to indicate that an object is damaged.

In further implementations, the imaging device 200 provides the indication of status including more details, such as by indicating what parameter is outside an acceptable range, the extent to which a parameter exceeds a threshold, the time in which the parameter has spent outside the acceptable range, etc. For example, the indication of the status for an expired item may include a notation that the item expired on January 1, and thus the user should not purchase the item. In still further implementations, the imaging device 200 provides an indication of status including an offer for a discount, or other such response to determining that the object 118 is flawed or soon to become flawed. For example, the imaging device 200 may determine, based on the chemical indicator(s), that the object 118 will expire the next day, and may then alert the prospective customer or a host associated with the imaging device 200 of the encroaching expiration data while offering a discount.

In further implementations, the imaging device 200 receives an indication of a particular parameter requirement. Depending on the implementation, the indication may be an indication for a specific value threshold of a parameter (e.g., the object must be at least 1 week ahead of expiration date), a broad range of values for a parameter (e.g., the object must have been kept in at least 20-50% humidity), a general description of the parameters (e.g., the object must be fresh, the object may be semi-fresh, the object may be expiring soon), etc. In such implementations, the imaging device 200 may confirm that the object falls within the bounds indicated based on the chemical indicator. The imaging device 200 may then provide an alert confirming compliance with the parameter requirement to a user, an originator of the indication, a host associated with the imaging device 200, etc. For example, a customer purchasing groceries through Buy-Online Pickup in Store (BOPIS) or for delivery may receive an indication that the groceries fit the freshness requested in the initial order.

Figure 5:
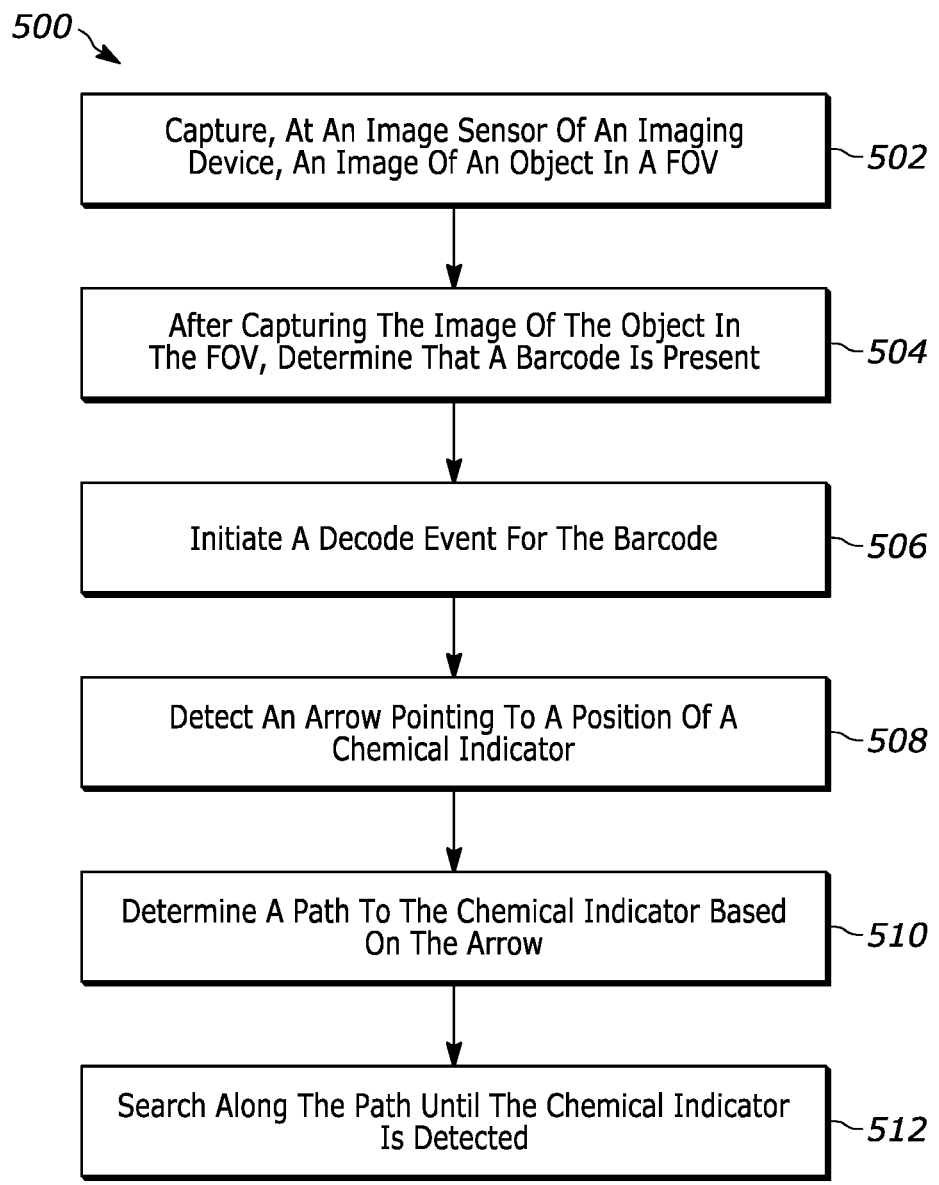
FIG. 5 illustrates a flow diagram of an example method for determining a location of a chemical indicator based on a detected marker.

Referring next to FIG. 5 the method 500 illustrates a flow diagram of an example method for determining a location of a chemical indicator based on a detected marker. Although the method 500 is described below with regard to imaging device 200 and components thereof as illustrated in FIG. 2, it will be understood that other similarly suitable imaging devices and components may be used instead.

In some implementations, the imaging device 200 performs blocks 502, 504, and/or 506 similarly to blocks 402, 404, and/or 406 of FIG. 4, respectively. As such, the various implementations for the imaging device discussed herein with regard to blocks 402, 404, and/or 406 may similarly apply as appropriate to the imaging device 200 while performing blocks 502, 504, and/or 506.

At block 508, the imaging device 200 detects a marker in the form of an arrow in the image. In some implementations, the arrow points to a position of a chemical indicator. In some such implementations, the imaging device 200 automatically assumes that the arrow points to a position of the chemical indicator upon detecting that the marker is an arrow. Depending on the implementation, the imaging device 200 may use OCR techniques as described herein to determine that the marker is an arrow and/or to determine in what direction the arrow points. In some implementations, a database stores a number of different arrows and the imaging device 200 consults the database to determine in what direction the arrow points.

At block 510, the imaging device 200 determines a path to the chemical indicator based on the arrow. In some implementations in which the arrow points to the chemical indicator, the imaging device 200 determines a path between the arrow and an edge of the label. Depending on the implementation, the imaging device 200 may detect the edge by comparing color or shading of the label and a surrounding area of the object 118, detecting differences in received light, comparing pixels in the captured image, etc. In some such implementations, the imaging device 200 determines the path between the arrow and the edge of the label by following the direction from the arrow until reaching the edge of the label or the chemical indicator. In other implementations, the imaging device 200 determines the path between the arrow and an edge of the captured image.

At block 512, the imaging device 200 searches along the path until the chemical indicator is detected. Depending on the implementation, the imaging device 200 may additionally or alternatively search along the path in the captured image until an edge of the label or an edge of the captured image is detected, as described with regard to block 510.

In some implementations, the imaging device 200 searches for the chemical indicator by detecting whether anything along the path matches an expected shape, size, color, etc. for the chemical indicator. In further implementations, the imaging device 200 searches for the chemical indicator by comparing pixels along the generated path to the decode indicia to determine whether the pixels contrast with the pixels of the decode indicia and are pixels of a chemical indicator, as described above with regard to FIG. 4.

In further implementations, the imaging device 200 transmits an indication that the chemical indicator is not found to a user. In implementations in which the chemical indicator is clear until the object 118 is outside of an acceptable parameter range (e.g., as described above with regard to FIG. 4), the indication may be a completed scan and/or a completed scan notification (e.g., an audio tone, a confirmation message, etc.). In other implementations, the indication may be an indication that that the object 118 is damaged or flawed, such as in implementations in which the chemical indicator turns clear when the object 118 is outside of an acceptable parameter range. In still other implementations, the indication may be an indication of an error occurring where the imaging device 200 would find the chemical indicator(s) regardless of whether the object 118 is within or outside of the acceptable parameter range.

Depending on the implementation, the imaging device 200 may continue searching after not finding the chemical indicator in the generated path. In some implementations, the imaging device 200 expands the search in an area surrounding the generated path. In other implementations, the imaging device 200 begins an additional search of the label from one side of the decode indicia. In still other implementations, the imaging device 200 begins the additional search from a predetermined corner of the label. In further such implementations, the corner may be the corner in the direction of the arrow. In some implementations, the imaging device 200 may provide the alert described above after performing the additional search, before performing the additional search, or while performing the additional search.

Figure 6:
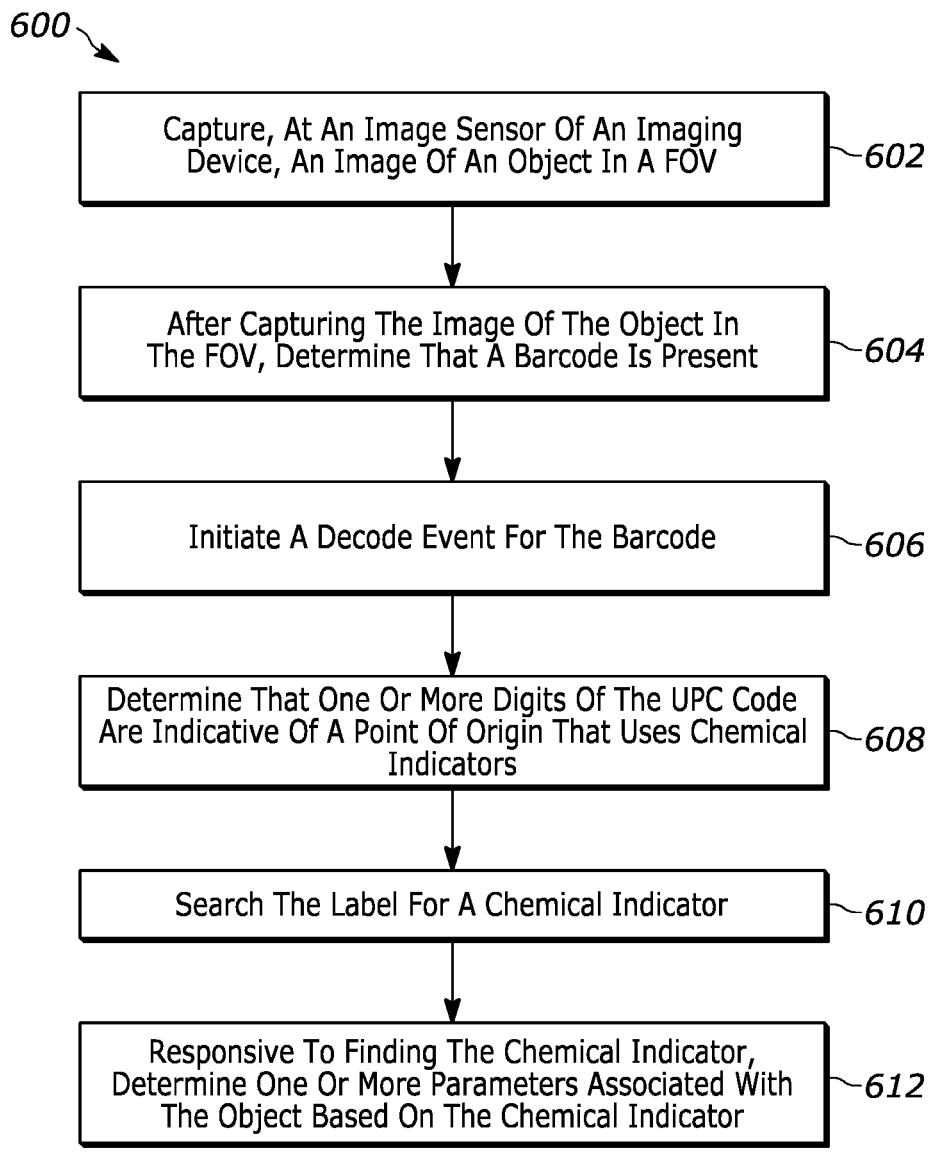
FIG. 6 illustrates a flow diagram of an example method for determining a location of a chemical indicator based on one or more UPC digits for a barcode.

Referring next to FIG. 6, the method 600 illustrates a flow diagram of an example method for determining a location of a chemical indicator based on one or more UPC digits for a barcode. Although the method 600 is described below with regard to imaging device 200 and components thereof as illustrated in FIG. 2, it will be understood that other similarly suitable imaging devices and components may be used instead.

In some implementations, the imaging device 200 performs blocks 602, 604, and/or 606 similarly to blocks 402, 404, and/or 406 of FIG. 4, respectively. As such, the various implementations for the imaging device discussed herein with regard to blocks 402, 404, and/or 406 may similarly apply as appropriate to the imaging device 200 while performing blocks 602, 604, and/or 606.

At block 608, the imaging device 200 determines that one or more digits of a UPC code associated with the decode indicia are indicative of a point of origin (e.g., a company, manufacturer, labeler, etc.) that uses chemical indicators. In some implementations, some of the digits of the UPC code indicate a point of origin for the object 118, and the imaging device 200 compares the digits to a database to determine whether the point of origin for the object 118 is one that uses chemical indicators. In some implementations, the imaging device 200 automatically determines that the label includes chemical indicators when the UPC code indicates that the point of origin uses chemical indicators and performs the remainder of method 600. In further implementations, the imaging device 200 determines for what types of objects the point of origin uses chemical indicators (e.g., by consulting a database). The imaging device 200 subsequently determines whether the object 118 is one the point of origin would use chemical indicators for. In some implementations, the imaging device 200 determines whether the object 118 belongs to such a category by completing the scan event and identifying the object 118. In other implementations, the imaging device 200 uses image analysis techniques to identify the object 118.

At block 610, the imaging device 200 searches the label with the decode indicia for a chemical indicator. Depending on the implementation, the imaging device 200 may search the label responsive to determining that the point of origin for the object 118 is a company that uses chemical indicators. In some implementations, the digit(s) of the UPC code indicate where the chemical indicator is located on the label and/or relative to the decode indicia. In further implementations, the imaging device 200 begins searching for the chemical indicator from a predetermined corner, from the center, from one side of the decode indicia, and/or any other such similar method as described herein. In some implementations, the imaging device 200 performs the search as described above with regard to blocks 412 and/or 510. As such, embodiments, implementations, and examples as described with regard to blocks 412 and/or 510 may similarly apply to block 610.

Similarly, at block 612, the imaging device 200 determines one or more parameters associated with the object based on the chemical indicator. In some implementations, the determination at block 612 is responsive to finding the chemical indicator. Depending on the implementation, the imaging device 200 may determine the parameters as described above with regard to block 414. As such, embodiments, implementations, and examples as described with regard to blocks 412 and/or 510 may similarly apply to block 610.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device for determining parameters of an object based on chemical indicators detected during a decode event, the imaging device comprising:
   a housing;
   one or more processors;
   an imaging assembly at least partially disposed within the housing, the imaging assembly including:
      an imaging sensor operable to capture an image of an object in a field of view (FOV); and a computer-readable media storing machine readable instructions that, when executed, cause the one or more processors to:
  after capturing the image of the object in the FOV, determine whether a decode indicia is present in the image of the object;
  initiate a decode event for the decode indicia present in the image of the object;
  detect a marker captured in the image of the object;
  determine, based on the marker, a location at which a chemical indicator is expected in the image of the object;
  search the location in the image of the object determined based on the marker to determine whether the chemical indicator is present;
  detect the chemical indicator, which is reactive to an environmental stimulus, at the location in the image of the object determined based on the marker; and
  determine, based on a reactive state of the chemical indicator, one or more parameters associated with the object.

2. The imaging device of claim 1, wherein the marker is an arrow pointing to the position of the chemical indicator, and searching the position includes:
  determining a path to the chemical indicator based on the arrow; and
  searching along the path until the chemical indicator is detected or an end of the path is detected.

3. The imaging device of claim 1, wherein the marker is one of a plurality of shapes, wherein each of the plurality of shapes is indicative of a different position for the chemical indicator.

4. The imaging device of claim 1, wherein the marker is at least one digit in a UPC code associated with the decode indicia.

5. An imaging device for determining parameters of an object based on chemical indicators detected during a decode event, the imaging device comprising:
  a housing;
  one or more processors;
  an imaging assembly at least partially disposed within the housing, the imaging assembly including:
    an imaging sensor operable to capture an image of an object in a field of view (FOV); and
  a computer-readable media storing machine readable instructions that, when executed, cause the one or more processors to:
    after capturing the image of the object in the FOV, determine whether a decode indicia is present in the image of the object;
    initiate a decode event for the decode indicia present in the image of the object;
    detect a chemical indicator in proximity to the decode indicia in the image of the object; and
    determine, based on the chemical indicator, one or more parameters associated with the object
  wherein detecting the chemical indicator includes:
    detecting a marker indicative of a position of the chemical indicator; and
    searching the position indicated by the marker to determine whether the chemical indicator is present,
  wherein the marker is at least one digit in a UPC code associated with the decode indicia,
  wherein the at least one digit is representative of a point of origin that uses chemical indicators, and
  wherein detecting the chemical indicator includes:
    determining, based on the at least one digit, that a chemical indicator may be present; and
    searching for the chemical indicator responsive to determining that the chemical indicator may be present.

6. The imaging device of claim 1, wherein the one or more parameters associated with the object includes at least one of: (i) a temperature of the object, (ii) a humidity of the object, (iii) a sunlight exposure of the object, (iv) a chemical exposure of the object, (v) a lifetime of the object, or (vi) an expiration status of the object.

7. The imaging device of claim 1, wherein determining the one or more parameters includes:
  determining that at least one of a coloring or a shading of the chemical indicator has changed from a default state; and
  based on the determining that the at least one of the coloring or the shading of the chemical indicator has changed, determining that a parameter of the one or more parameters associated with the chemical indicator has passed a predetermined threshold.

8. The imaging device of claim 7, wherein determining that the at least one of the coloring or the shading of the chemical indicator has changed from the default state includes:
  comparing the at least one of the coloring or the shading of the chemical indicator to a coloring or a shading of the decode indicia to generate a color comparison; and
  determining, based on the color comparison, that the at least one of the coloring or the shading of the chemical indicator has changed from the default state.

9. The imaging device of claim 1, wherein determining the one or more parameters includes:
  determining that at least one of a coloring or a shading of the chemical indicator has changed from a default state; and
  based on the at least one of the coloring or the shading of the chemical indicator, determining a current state of a parameter of the one or more parameters associated with the chemical indicator.

10. The imaging device of claim 9, wherein determining that the at least one of the coloring or the shading of the chemical indicator has changed from the default state includes:
  comparing the at least one of the coloring or the shading of the chemical indicator to a coloring or a shading of the decode indicia to generate a color comparison; and
  determining, based on the color comparison, that the at least one of the coloring or the shading of the chemical indicator has changed from the default state.

11. The imaging device of claim 1, wherein the machine readable instructions include instructions that, when executed, further cause the one or more processors to:
  provide an indication of a status of the one or more parameters to a user.

12. The imaging device of claim 11, wherein providing the indication of the status includes:
  detecting, based on the one or more parameters, a flaw with the object; and
  alerting at least one of the user or a host associated with the imaging device that the object is flawed.

13. An imaging device for determining parameters of an object based on a chemical indicator detected during a decode event, the imaging device comprising:
  a housing;
  one or more processors;

an imaging assembly at least partially disposed within the housing, the imaging assembly including:
an imaging sensor operable to capture an image of an object in a field of view (FOV); and
a computer-readable media storing machine readable instructions that, when executed, cause the one or more processors to:
after capturing the image of the object in the FOV, determine whether a decode indicia is present in the image of the object;
initiate a decode event for the decode indicia present in the image of the object;
detect a chemical indicator in proximity to the decode indicia in the image of the object; and
determine, based on the chemical indicator, one or more parameters associated with the object,
wherein the machine readable instructions include instructions that, when executed, further cause the one or more processors to:
provide an indication of a status of the one or more parameters to a user,
wherein providing the indication of the status includes:
detecting, based on the one or more parameters, a potential flaw with the object; and
offering a discount to the user based on the potential flaw.

14. The imaging device of claim 13, wherein detecting the chemical indicator includes:
detecting a marker indicative of a position of the chemical indicator; and
searching the position indicated by the marker to determine whether the chemical indicator is present.

15. The imaging device of claim 14, wherein the marker is an arrow pointing to the position of the chemical indicator, and searching the position includes:
determining a path to the chemical indicator based on the arrow; and
searching along the path until the chemical indicator is detected or an end of the path is detected.

16. The imaging device of claim 14, wherein the marker is one of a plurality of shapes, wherein each of the plurality of shapes is indicative of a different position for the chemical indicator.

17. The imaging device of claim 14, wherein the marker is at least one digit in a UPC code associated with the decode indicia.

18. The imaging device of claim 17, wherein the at least one digit is representative of a point of origin that uses chemical indicators, and wherein detecting the chemical indicator includes:
determining, based on the at least one digit, that a chemical indicator may be present; and
searching for the chemical indicator responsive to determining that the chemical indicator may be present.

19. The imaging device of claim 1, wherein the one or more parameters associated with the object includes at least one of: (i) a temperature of the object, (ii) a humidity of the object, (iii) a sunlight exposure of the object, (iv) a chemical exposure of the object, (v) a lifetime of the object, or (vi) an expiration status of the object.

* * * * *